United States Patent [19]
Perkins et al.

[11] 4,303,023
[45] Dec. 1, 1981

[54] FLUIDIZED BED FUEL BURNING

[75] Inventors: Stephen P. Perkins, Rowley; Alex F. Wormser, Marblehead, both of Mass.

[73] Assignee: Wormser Engineering, Inc., Middleton, Mass.

[21] Appl. No.: 92,491

[22] Filed: Nov. 8, 1979

[51] Int. Cl.³ ............................................. F23D 1/00
[52] U.S. Cl. .................................. 110/347; 110/203; 110/210; 110/245; 110/345; 122/4 D; 422/142; 431/7
[58] Field of Search ............... 110/347, 245, 263, 345, 110/210, 214, 203; 122/4 D; 431/7, 170; 422/142

[56] References Cited

U.S. PATENT DOCUMENTS

| | | | |
|---|---|---|---|
| 3,888,193 | 6/1975 | Kishigame et al. | 110/245 |
| 3,902,462 | 9/1975 | Bryers | 122/4 D |
| 3,945,810 | 3/1976 | Saito | 110/245 X |
| 4,057,402 | 11/1977 | Patel et al. | 110/347 X |
| 4,154,585 | 5/1979 | Melcher et al. | 110/245 X |
| 4,240,927 | 12/1980 | Karweil et al. | 422/142 X |
| 4,263,262 | 4/1981 | Jukkola | 422/142 X |

FOREIGN PATENT DOCUMENTS 1084977  9/1967  United Kingdom ............... 110/245

Primary Examiner—Edward G. Favors

[57] ABSTRACT

A process for desulfurizing fuel wherein a fuel is introduced and burned in a first fluidized bed and wherein a second fluidized bed is utilized to treat the products of combustion from the first fluidized bed.

18 Claims, 1 Drawing Figure

FLUIDIZED BED FUEL BURNING

FIELD OF THE INVENTION

This invention relates to burning and desulfurizing fuel, particularly coal, using fluid bed combustors.

BACKGROUND OF THE INVENTION

Some related background is set forth in our U.S. Pat. No. 4,135,885, "Burning and Desulfurizing Coal" (not prior art), the contents of which are herein incorporated by reference. Further related background and disclosures are set forth in the application of Alex F. Wormser, "Fluid Bed Combustion," Ser. No. 31,782, filed Apr. 20, 1979 in the United States Patent and Trademark Office, now U.S. Pat. No. 4,279,207, and in the application of Stephen P. Perkins and Alex F. Wormser, "Storage," Ser. No. 078,651 mailed to the Patent and Trademark Office on Sept. 20, 1979, now U.S. Pat. No. 4,279,205 the contents of both of which are hereby incorporated by reference herein.

Coal burners with fluidized beds and using sorbents such as limestone are known in the prior art. However, prior art burners have not disclosed any approach providing as much optimization of a number of variables as is desirable.

SUMMARY OF THE INVENTION

We have discovered that by providing for combustion (ordinarily in oxygen from primary air) without sorbent present in an upstream fluidized (slow, matrix material not leaving the bed) zone, and by providing for treatment, with sorbent (e.g., limestone) and otherwise, in a downstream fluidized zone, it is possible to provide important improved flexibility of optimization. The burner zone may be operated, with many coals, at higher temperatures, providing increased fuel and system efficiency, and also without (owing to the absence of limestone) causing undue fireside corrosion of water tubes. This also makes possible optimizing fuel-to-air ratios and the particular solids content (material and size) chosen for use in each zone. Burning in the manner just described also makes possible optimizing removal of carbon monoxide and oxides of nitrogen.

Combustion efficiency is maximized when the combustion bed is operated at the highest possible temperature below ash fusion and in the presence of an excess of air at or downstream of the combustion bed; $NO_x$ formation is minimized by operating the combustion bed at a similarly high temperature, and also by permitting the nitrogen oxide associated with the volatiles to be chemically reduced to molecular nitrogen in the downstream bed in the presence of char and a small excess of oxygen; carbon monoxide formation is minimized by combustion with an excess of air, at a temperature above 1430° F.; sulfur dioxide removal is maximized by the operation of the downstream bed at 1550° F.±50° in the presence of an excess of oxygen; the presence of the char required to reduce the $NO_x$ associated with the volatiles is promoted by the combustion of coal in a reducing atmosphere in the combustion bed; omitting sorbent from the burnzone permits heating tubes to higher temperatures without undue fireside corrosion; and the increased heated fluid temperatures permitted thereby result in additional system efficiency.

DESCRIPTION OF THE PREFERRED EMBODIMENT

Figure 1:
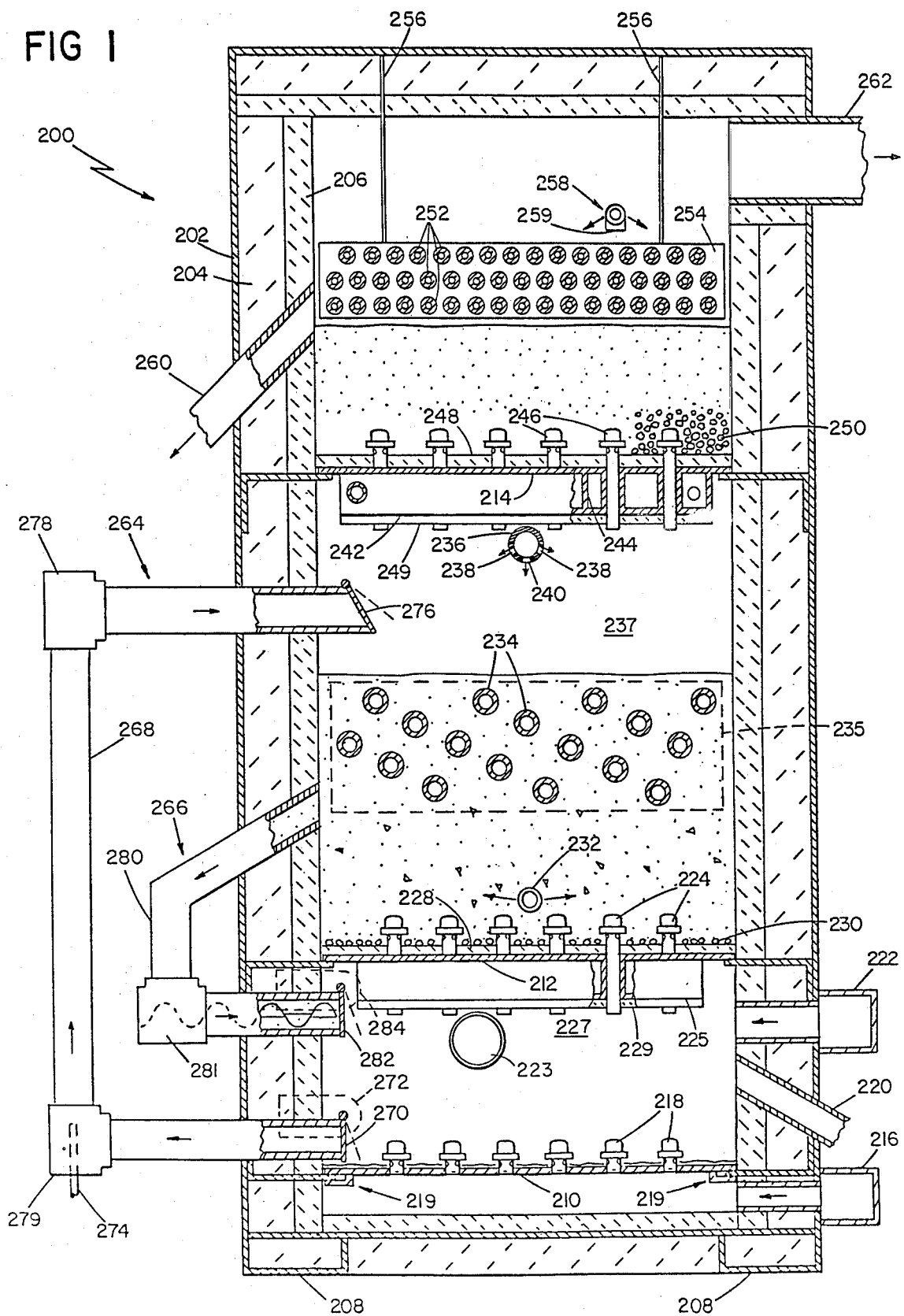
FIG. 1 is a diagrammatic view, mainly in section, of the most preferred embodiment of the invention.

We turn to description of the structure and then operation of the embodiment of FIG. 1.

Structure

There is shown in FIG. 1, diagrammatically, a three-bed all fluidized, combustor-desulfurizer, indicated generally at 200. A metal housing 202 surrounds layers 204 and 206 of lower and higher density refractory, respectively, to enclose the entire unit, which rests on supports 208. Metal distributor plates 210, 212, and 214 extend across the housing interior to define the bottoms, respectively, of three fluidized beds—a lower bed for storing sand, a middle combustor bed, and an upper desulfurizer bed.

The lower sand storage bed has under it a plenum fed by a windbox 216, through which fluidizing air enters the bed underneath distributor plate 210. A multiplicity of bubble caps 218 extend through plate 210 (over which extends an insulating board, not shown, to avoid hot spots), which is held in place by expandable joints 219. Extending through the housing wall above caps 218 is coarse-ash disposal pipe 220, which carries away to a baghouse hopper excess bed material.

The middle combustor bed has under it plenum 227 for supplying fluidizing combustion air to the middle bed. A multiplicity of bubble caps 224 extend through distributor plate 212 and water jacket 225, which serves to cool plate 212 to prevent it from buckling. A layer of insulation 228 rests on plate 212 surrounding each of caps 224, and a layer of stone 230 (actually coarse quartz in a mix of sizes from ⅜" to 1" in diameter) covers insulation 228. A similar layer of insulation 229 is secured (by means not shown) to the bottom of water jacket 225. The insulation serves to cut heat loss to the water in jacket 225. Above bubble caps 224 is coal feed pipe 232, which deposits coal at the bottom of the combustor bed, just above bubble caps 224. (Under-the-bed feeding of the coal allows the use of coal fines in the feed which would otherwise, i.e., with over-the-bed feeding, be blown out of the bed without combusting. Over-the-bed feeding would also make it difficult to operate the bed in any but its full-on position, i.e., with sand covering the top of steam tubes 235. At lower sand levels, with over-the-bed feeding, the coal would fall onto the steam tubes, and an agglomeration of unburned coal would soon build up. The inability to operate at reduced sand levels in the middle bed would eliminate use of the preferred turndown and startup methods, as will be described.)

Above pipe 232 and extending across the combustor bed are steam tubes 234, which are mounted at their ends in tube sheets 235 (one shown in broken lines) that define manifolds for introducing water into the tubes and removing water and steam from them. Tubes 234 are spaced and occupy 25% of the housing volume in the zone from the top row of tubes to the bottom row.

The upper desulfurizer bed has under it apertured secondary air pipe 236, which has two rows of holes 238 inclined downwardly at 30° for spreading out the secondary air beneath the upper bed and a third row of holes 240 at the bottom of the pipe for blowing out any particles that may have gotten into the pipe. Above pipe 236 is water jacket 242, which serves to cool distributor plate 214 to prevent it from buckling. Baffles 244 (one shown) serve to keep the velocity of the circulating cooling water high enough to avoid local hot spots that might cause damage. A multiplicity of bubble caps 246 extend through jacket 242 and plate 214. A layer of insulation 248 rests on plate 214 surrounding each of caps 246, and a layer of stones 250 (the same materials as stones 230) covers insulation 248 and caps 246. A similar layer of insulation 249 is secured to the bottom of water jacket 242. The insulation serves the same purposes as that for the middle bed distributor and water jacket. (The purpose of the stones 250 is to allow the gases emerging from bubble caps 246 to spread laterally over the distributor, allowing them to emerge into the upper bed at a sufficiently low velocity to avoid shattering the limestone particles.) Above the upper bed are three rows of tubes 252 to deflect particles back into the bed. Each tube in the middle row is positioned directly above a corresponding tube in the bottom row, but each of the tubes in the top row is positioned halfway between each adjacent pair of vertical pitch lines for the lower two rows. This arrangement avoids the possibility of a line of sight opening at any angle through the tubes so any particle that is ejected from the bed will solidly contact one of the tubes before leaving the bed, thereby reducing its speed and the likelihood of splashing into the freeboard. (A similar bank of tubes may usefully be placed above the second—i.e., combustion—bed.) Tubes 252 are supported near their ends and at spaced positions longitudinally thereof by apertured sheets 254 (only one shown), which are in turn supported from housing 202 by rods 256. Above tubes 252 extends limestone feed pipe 258, which deposits limestone in the desulfurizer bed to a level just above the top row of tubes 252. The limestone drops from the outlet tee 259 of pipe 258 through a gap (not shown) in the assembly of tubes 252; without the gap, some limestone particles may be too large to pass through the tube assembly. Limestone downcomer 260 cooperates with a limestone pot to maintain the level of limestone just above tubes 252 and to carry away spent limestone. Hot desulfurized gases leave through smoke pipe 262, through which they can be transported through a boiler to which they give up their remaining heat, then to a baghouse for removal of any ash or other particulates that may escape from the upper bed, and finally to a stack.

Upcomer assembly 264 and downcomer assembly 266 permit bed material to be moved from the lower bed to the middle bed and vice versa, for preheating and turndown (both to be discussed in more detail subsequently). Upcomer assembly 264 includes upcomer piping 268, which, when door 270 is opened by actuator 272 (shown in broken lines because it is mounted on the exterior of housing 202), permits bed material to be taken from the lower bed and blown by air under pressure from tube 274 into the middle bed through door 276, which is held shut by gravity to prevent filling up of the upcomer piping with bed material when it is not in use but which opens in response to bed material forced up from the lower bed. The normal bed material level for operating the combustor at 100% of capacity is just above the topmost steam tubes, as shown in FIG. 1. Tee fittings 278 and 279 are used when the bed material makes a sharp turn, to reduce wear on the piping there.

Downcomer assembly 266 includes downcomer piping 280, which, when door 282 is opened by actuator 284 (shown in broken lines because it is mounted on the exterior of the housing), permits bed material that has entered the piping from the middle bed to be fed with a feed screw into the lower bed. For normal operation downcomer piping 280 should be filled with bed material to act as a pressure seal so that air from plenum 227 is not able to keep bed material from coming down the piping. Tee fitting 281 is positioned where the bed material makes a sharp turn.

Turning to further particular details of the structure of FIG. 1, we again make reference to U.S. application, Ser. No. 31,782, above-mentioned.

Operation

Sand sized at about 20 mesh (850μ) is supplied to fill the middle bed to a depth of about 11.5". Type 1360 limestone crushed to a mean particle diameter of 20 mesh (850μ) is supplied through feedpipe 258 to fill the upper bed to a depth of about 6".

Start-up of a cold combustor required preheating as follows. Fluidizing air is supplied from a blower (not shown) through windbox 216, and the middle bed, assuming that it has been previously filled with bed material, is emptied via downcomer assembly 266 until the bed level is below the inlet to the downcomer so that boiler tubes 234 are no longer covered with bed material (remaining material is about 6" deep). Air from the windbox 216 passing through bubble caps 218 acts to spread out the bed material deposited by the downcomer, and directed through the storage bed when either the upcomer or downcomer is in operation, to keep the lower bed material uniformly spread out. When the bed level in the middle bed is down to 6 inches, the fluidizing air is turned off. The water circulator pump for pumping water through tubes 234 is turned on. Preheater 223, which is spaced below distributor 212 to provide uniform heating of the middle bed, is then turned on. Flames generated in the preheat burner are cooled to approximately 1700° F. by secondary air before they emerge from the burner, to avoid overheating bubble caps 224. Hot gases emerging from the preheat burner 223 heat the material in the middle bed to about 1000° F. in about an hour, following which coal is added for a minute with fluidization (to assist further preheating), following which preheating is resumed 15 minutes or so, until the bed reaches about 1350° F. Because the boiler tubes are not in contact with material in the middle bed, they do not draw heat from the bed material, and because the bed material is heated when it is not being fluidized (i.e., as a fixed bed), the surface area for heat loss from the bed material is reduced, so that the bed material can be heated with a fairly small preheater.

When the middle bed has reached 1350° F., the propane-fired preheater is turned off. Fluidizing combustion air from the blower is supplied through windbox 222 and through bubble caps 224 to fluidize the middle bed. The fluidizing combustion air is controlled by a valve (not shown) to provide an airflow of 110 scfm per square foot of bed area, which produces a superficial velocity of approximately 7½ ft/sec. in the upper bed at 1550° F. The coal feed screw and transport air compressor (not shown) feeding air to the coal pot at the inlet pipe and to the limestone rotary feeder outlet (not shown) are then started, and coal is fed from a bin (not shown) through a screw feeder, a drier, a crusher, a rotary air lock, and a coal pot (all not shown), and to the middle bed through pipe 232. The coal mixes with the hot bed material and burns. Fluidization causes the coal to be distributed away from the coal feed pipe and become mixed throughout the bed. The heat released from the burning coal heats the bed, until the middlebed approaches the desired temperature of 1800° F. (A lower setting may be required to avoid clinkering when coals with low-ash-fusion-points are used; and a higher setting may be used with hard-to-burn, unreactive fuels with high-ash-fusion-points.) The middle bed is kept from reaching a hotter temperature in part by the cooling effects of the steam tubes 234, which are being splashed by the fluidized bed material, and in part by the effect of the control themocouple in the middle bed, which serves to control the middle-bed's temperature by adjusting the speed of the screw feeder thereby affecting the fuel/air ratio in the middle bed. Typically the burner will be operating at an excess air of 100% at this condition.

Simultaneously with the coal feed, the limestone feed to the upper bed is started, at a predetermined Ca/S ratio. The limestone, −⅜ +5/16" chips, flow from a limestone bin (not shown) through the rotary feeder and are pneuamtically conveyed to the upper bed through pipe 258. The rate at which the limestone is fed is determined by the speed of the limestone rotary feeder, whose speed is slaved to the coal screw feeder in order to provide the predetermined Ca/S ratio.

Gases emerging from the middle bed pass through bubble caps 246 and the upper bed, and leave combustor-desulfurizer 200 at pipe 262. As the temperature of the upper bed reaches the upper-bed set point of 1550° F., which is the temperature at which desulfurization efficiency is best, a thermocouple in the upper bed causes a modulating valve (not shown) at the combustion-air blower to open, causing secondary air to flow into the middle-bed freeboard 237 through secondary air pipe 236. The secondary air flow rate is modulated continuously to maintain the upper-bed temperature at 1550° F.

Solids too small to remain in the middle bed, including ash and small particles of carbon, are blown through bubble caps 246 and trapped in the upper bed, where combustion of the small bits of carbon is continued for a few moments, before being blown from the upper bed and out of the burner at duct 262.

Particles too coarse to blow out of the upper bed will cause the upper bed level to rise, causing excess material to be removed at limestone overflow pipe 260.

Modifications and Variations

Another mode of operation, called the low-nitricoxide mode, arranges to have the combustion bed operated substoichiometrically (typically at an equivalence ratio of 0.85), while the upper bed is operated at a slight excess-air level (typically, 3%), and to have tertiary air added above the desulfurizing bed through an aerodynamic mixer (not shown) to create an atmosphere containing 20–30% air at the burner-desulfurizer's outlet. The freeboard above the upper bed will need to be increased, to allow unburned hydrocarbons, including carbon monoxide, to be adequately combusted. The purpose of this method is to minimize the nitric oxide (NO) emissions from the burner, while still achieving good combustion efficiency and pollution characteristics with regard to $SO_2$, CO, and other hydrocarbons. Operation of the combustion bed at substoichiometric conditions reduces the rate of combustion of the coal particles, thereby increasing the carbon content of both the combustion bed and the desulfurizing bed. Previous investigators (Beer, et al. "NO Reduction by Char in Fluidized Combustion," *Proc. of the 5th Conf. on Fluidized Bed Combustion*, Washington, DC, December '77) have shown that the presence of small amounts of carbon in a bed is sufficient to drastically reduce the NO level emitted from a fluid bed. Other investigators (Horio, et al., "A Model Study for the Development of Low $NO_x$ Fluidized-Bed Coal Combustors," *Proc. of the 5th Conf. on Fluidized Bed Combustion*, Washington, DC, December '77) have taught that a two-stage fluidized bed combustor is particularly effective at mixing the NO with the carbon, thereby chemically reducing the NO to form molecular nitrogen. The oxygen level in the upper bed must be optimized to meet both the requirements of desulfurization, which is favored by an excess-oxygen atmosphere, and of NO reduction, which is favored by a low-oxygen atmosphere, although the presence of small amounts of oxygen (typically, 3% excess air), are acceptable to the NO reduction process.

The burner-desulfurizer 200 of the preferred embodiment has a capacity of 10,000,000 BTU/hr. Actually, the design is suitable for a wide array of sizes ranging from the commercial sizes of 1 million BTU/hr. to the electric utility size rated at up to 10 billion BTU/hr. The steam conditions at steam tubes 234 depend upon the application. In electrical utility generation, where the highest steam temperature and pressures are desired because of the effect on thermal efficiency, steam temperatures as high as 1200° F. may be obtained, at supercritical pressures. These exceed the temperatures, by about 200° F., of both conventional oil and coal-fired boilers and of conventional fluidized bed combustors, and may reduce the fuel consumption of such systems by 5 to 10 percent, as well as prolonging boiler life and improving maintainability. As has been taught elsewhere, (John Stringer, "Materials for Fluidized Bed Combustor," *3rd Annual Conference on Materials for Coal Conversion and Utilization*, NBS, Gaithersburg, Md., October 1978, p. 154, et al.), the mechanism for fireside corrosion that had formerly limited the maximum steam temperature combustors are not released in the lower-temperature fluidized bed systems. But fluidized bed combustors may experience fireside corrosion, due to the presence of calcium sulfate that coats the steam tubes. This form of corrosion is eliminated by the use of sand, rather than sorbent, adjacent to the steam (or, e.g., compressed air) tubes in the combustor-desulfurizer 200, thereby eliminating the corrosion-producing sulfate coating, and allowing the boiler to be operated at temperatures determined by factors other than fireside corrosion.

Any type of coal may be used, of any rank, sulfur content, moisture, caking characteristic, or ash content. Waste fuels, containing large amounts of inert material, such as culm or shale, may also be burned, as may unreactive fuels such as coke breeze. In the former case, some or all of the steam tubes may have to be moved out of the splash zone of the middle bed; this is achieved by removing tubes 234, or raising them far enough to avoid their being splashed by bed material when the bed depth is at its minimum value. Other fuels including wood chips, as well as oil and natural gas, may also be used. For these fuels, a method of injecting the fuel into the bed at close intervals is required; such methods have been described in the prior art. Provisions for these fuels would allow the unit to be operated whenever changes in fuel prices or unavailability of supplies indicates a switch in the fuel type. Burning of oil in the combustor-desulfurizer 200 may also be preferrable to the burning of this fuel in conventional boilers, particularly if the oil contains an objectionably high sulfur level; the levels of nitric oxide may also be reduced without the use of a scrubber, and the maximum steam temperature that may be achieved without the occurrence of fireside corrosion, may also be increased.

What is claimed is:

1. A method of burning and desulfurizing fuel which comprises
    introducing said fuel and air or oxygen into a slow fluidized bed combustor containing an inert matrix material to provide burning therein, and
    moving the products of combustion from said fluidized bed combustor into a second fluidized bed treatment zone containing a second and different desulfurizing matrix,
    in which said fluidized bed combustor is at a higher temperature than the temperature of said fluidized bed treatment zone.

2. The method of claim 1 in which secondary air is also introduced upstream of said treatment zone.

3. The method of claim 2 in which tertiary air is introduced downstream of said treatment zone.

4. The method of claim 1 in which the temperature of said fluidized bed combustion is maintained at just below the temperature at which flow properties in said system are substantially impaired.

5. The method of claim 1 in which said second matrix comprises a sorbent reactive with sulfur-containing products.

6. The method of claim 5 in which said fuel is coal, in which said fluidized bed combustor is maintained at a first temperature below the temperature at which flow properties in said system is substantially impaired, and said fluidized bed treatment zone is maintained at a second temperature lower than said first temperature.

7. The method of claim 6 in which said air or oxygen is introduced into said combustor in an amount in excess of stoichiometric.

8. The method of claim 7 in which secondary air is introduced upstream of said treatment zone to improve desulfurization.

9. The method of claim 8 in which said second temperature is 1550° F.

10. The method of claim 9 in which downstream of said treatment zone air is present in 30 percent excess of stoichiometric.

11. The method of claim 6 in which said air or oxygen is introduced into said combustor in an amount less than stoichiometric and in which air or oxygen is introduced upstream of said treatment zone in amount adequate to bring total air or oxygen present in excess of stoichiometric.

12. The method of claim 11 in which said excess is 3%.

13. The method of claim 11 in which tertiary air is added downstream of said treatment zone to increase the percentage by which said air or oxygen is in excess.

14. The method of claim 13 in which said excess is 30%.

15. The method of claim 7 in which said sorbent comprises calcium oxide.

16. The method of claim 11 in which said sorbent comprises calcium oxide.

17. The method of claim 15 in which said fuel is coal or oil.

18. The method of claim 16 in which said fuel is coal or oil.

* * * * *